June 26, 1928.

T. S. MILLER 1,674,979

DRIVING MECHANISM

Filed Sept. 15, 1922

2 Sheets-Sheet 1

INVENTOR.
Thomas Steven Miller
BY Gifford, Bull & Scull
his ATTORNEYS

June 26, 1928.

T. S. MILLER

DRIVING MECHANISM

Filed Sept. 15, 1922

1,674,979

2 Sheets-Sheet 2

INVENTOR
Thomas Spencer Miller
BY Gifford, Bull & Scull
his ATTORNEYS

Patented June 26, 1928.

1,674,979

UNITED STATES PATENT OFFICE.

THOMAS SPENCER MILLER, OF SOUTH ORANGE, NEW JERSEY.

DRIVING MECHANISM.

Application filed September 15, 1922. Serial No. 588,301.

My invention relates to driving mechanisms, and particularly to a multi-speed device for use with winding drums, gears or the like. My invention has been found to be very useful in connection with logging machinery of the multi-speed skidding type. It has a great variety of uses and applications and is, therefore, not limited to the use above mentioned.

Figure 1:
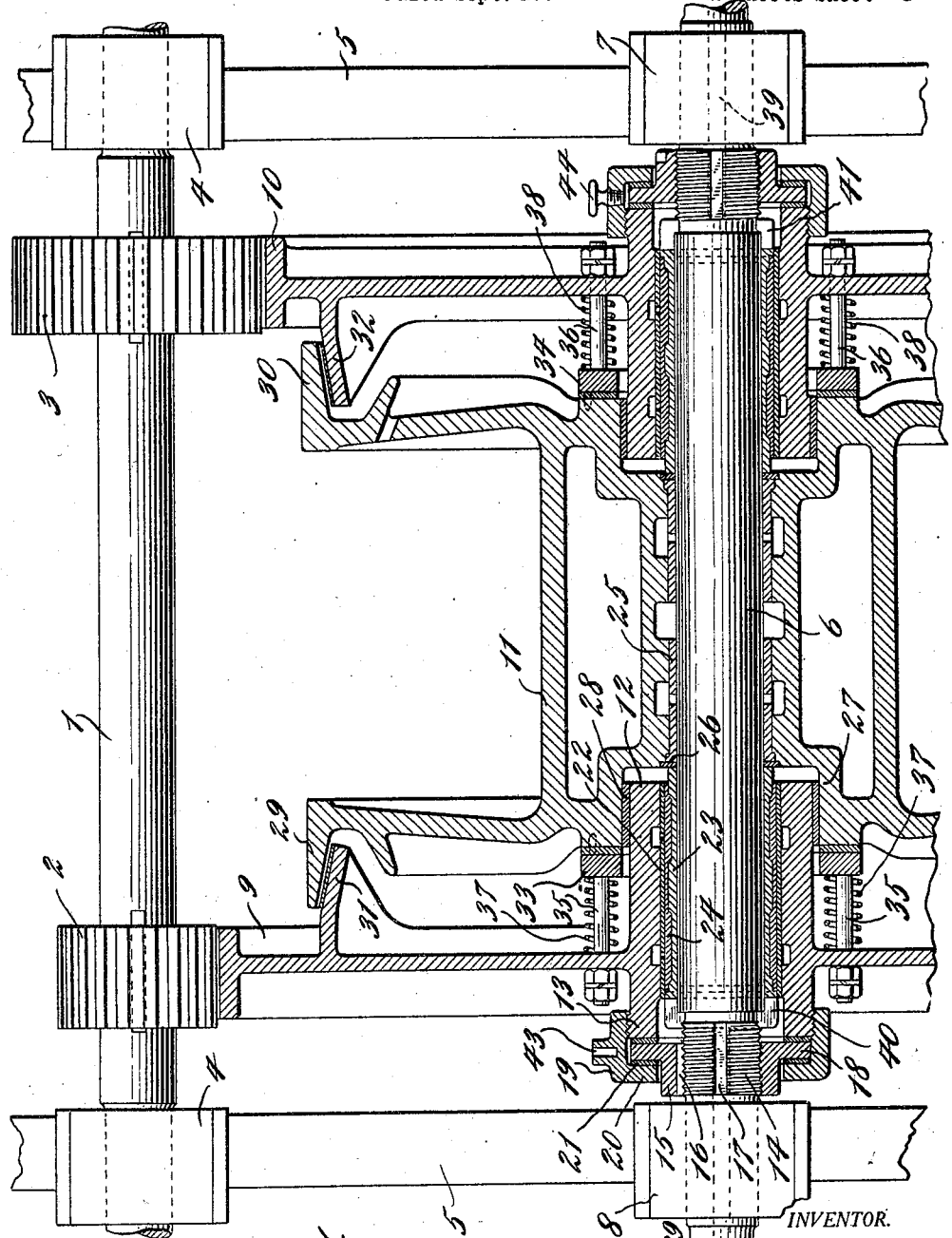
Figure 2:
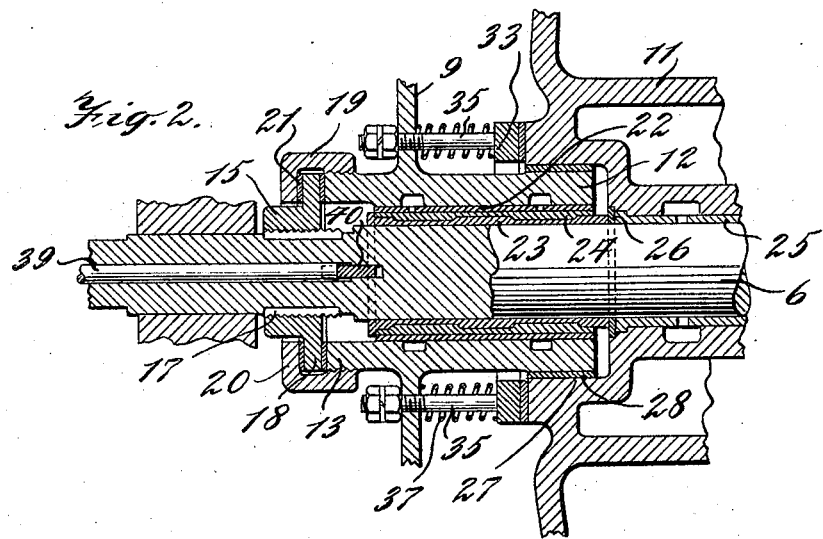
Figure 3:
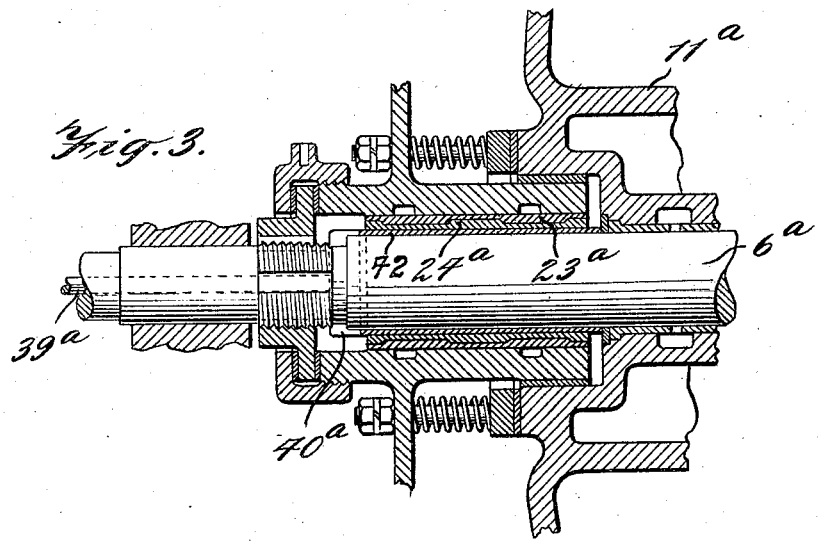

I have chosen to illustrate my invention as applied to a two-speed drum drive, and it will be better understood by reading the following description in connection with the accompanying drawings illustrating one embodiment thereof, and in which Fig. 1 is a view showing a part of the drum in section; Fig. 2 is a view similar to Fig. 1, with the shaft rotated 90°, and Fig. 3 is a view similar to Fig. 1, showing a different form of bearing.

Referring to Fig. 1, the device comprises a drive shaft 1 upon which are keyed gears 2 and 3. The shaft 1 is supported near its ends by bearings 4 which are carried by the frame 5. The shaft 1 may be provided with crank pins so as to be driven from a steam engine or by other means. The shaft 6 is mounted in bearings 7 and 8 which are also carried by the frame members 5. The shaft 6 is parallel with the shaft 1. Two gears 9 and 10 are loosely mounted upon the shaft 6. A drum 11 is also loosely mounted upon the shaft 6.

The gears 2 and 3 are of different diameters and the gears 9 and 10 are likewise of different diameters, as a result of which the gear 9 is driven at a slower speed than the gear 10. The mountings of the gears 9 and 10 upon the shaft 6 are identical, and therefore, a description of one will be sufficient for both. The gear 9 has a hub, one end 12 of which extends inwardly and the other end 13 of which extends outwardly toward the bearing 8. The shaft 6 has a threaded portion 14 near its end and a thrust nut 15 is screwed thereon. The thrust nut 15 has a keyway 16 therein and the shaft 6 at the threaded portion is provided with four keyways 17 placed 90° apart around the shaft. When the thrust nut 15 has been adjusted so that the keyway 16 registers with one of the keyways 17 in the shaft, a key may be driven into the opening and will thus act to lock the thrust nut 15 in position against rotation on the shaft. The thrust nut 15 has an annular flange 18. An adjustable ring 19 is screwed onto the end 13 of the hub of gear 9. This ring has an inwardly projecting annular flange 20. The flange 18 on the thrust nut 15 extends between the flange 20 and the end 13 of the hub. Bearing material 21 is placed between the flange 18 and the flange 20 and also between the flange 18 and the end 13 of the hub.

The hub of the gear 9 is provided with a steel bushing 22 which is forced into the hub and rotates therewith. A steel sleeve 23 is loosely mounted on the shaft 6 and is provided with bearing material 24.

The drum 11 is provided with a bushing 25, preferably of bearing material, such as bronze. This bushing is movable longitudinally of the shaft 6. A steel washer 26 surrounds the shaft 6 between the ends of the bushings 23 and 25. The drum 11 is also provided with an enlarged cylindrical portion 27, which overlaps the end 12 of the hub of the gear 9 and between which parts is placed bearing material 28. By this arrangement, the drum 11 is provided with bearings which overlap the hubs of the gears 9 and 10. This arrangement provides additional support for the drum, and thereby greatly strengthens the drum mounting.

The drum is provided with hollow conical surfaces 29 and 30 which are adapted to be brought into contact with corresponding conical portions 31 and 32 on the gears 9 and 10, respectively. Rings 33 and 34 surround the hubs of the gears 9 and 10, respectively, and engage the ends of the drum 11. These rings are supported in position by bolts 35 and 36 which are suitably placed around the shaft 6 and pass through openings made in the webs of the gears 9 and 10. Coil springs 37 and 38 surround the bolts and act to hold the rings in the positions shown. Bearing metal is placed between each of the rings and the drum for obvious reasons. By properly adjusting the bolts 35 and 36, the springs 37 and 38 act to normally hold the drum 11 in the position shown in Fig. 1; that is to say, the drum is disconnected from both gears 9 and 10.

In the operation of the device, the drum 11 must be pushed in one direction or the other in order that it may be operatively connected with the gear 9 or 10. The means for so operating the drum consist of thrust pins 39, one of which is placed in an opening in each end of the shaft 6. Slots are cut through the shaft 6 and keys 40 and 41 are placed in the slots. The slots are wider longitudinally of the shaft than the keys so that the keys may be moved longitudinally of the shaft. The ends of the keys are placed in corresponding notches in the sleeves 23, so that these sleeves are held by the ends of the keys against rotation with the gears 9 and 10. The thrust rods 39 bear against the keys, as shown in Fig. 2. When it is desired to move the drum into engagement with the gear 10, for instance, the thrust pin 39 is moved to the right, which causes the key 40 to be moved to the right which, in turn, engages the end of the sleeve 23, thus moving it to the right, as viewed in Fig. 1. The sleeve 23 engages the ring 26 which engages the end of the drum, so that when the sleeve 23 moves to the right, it moves the drum therewith, thus bringing the parts 30 and 32 into contact with each other, whereupon the drum 11 is rotated with the gear 10. Exactly the same operation takes place when the drum is moved into operative relation with the gear 9, except that the thrust is placed upon the thrust rod 39 at the right of Fig. 1.

When the thrust is removed from the thrust rods, the springs 37 and 38 act to move the drum to neutral or disconnecting position.

The rings 19 may be adjusted to make allowance for wear by inserting a turning bar in the slot 43 or by otherwise rotating these rings on the threaded portions of the hubs of gears 9 and 10. An oil plug 44 may be suitably placed, so as to furnish lubricant for the flanges on the thrust nuts 18.

Fig. 3 shows a modification in which similar parts are given similar numbers with the exponent "a" added thereto. The construction shown in this figure differs from that shown in Figs. 1 and 2 principally in that the bushing 23$^a$ is driven into the bore of the gear and rotates therewith. This bushing is provided with bearing material 24$^a$ which contacts with a steel sleeve 42 slidably mounted on the ends of the shaft 6$^a$. The sleeve 42 cooperates with the thrust rods 39$^a$ and keys 40$^a$ to move the drum 11$^a$ into contact with the driving gears.

Only one end of the drum mounting is shown in Fig. 3, but it will be understood that the other end of the drum is a duplicate of that shown.

My invention has many advantages, among which may be mentioned that the drum is provided with wearing elements of long life, together with means for adjusting to take up for wear; the gears are likewise provided with wearing elements of long life, whereby the upkeep and maintenance of the construction is greatly lessened as compared with structures as heretofore constructed. The arrangement whereby the drum bears upon the hubs of the gears adds greatly to the strength of the drum mounting, and therefore greatly prolongs its life. Simple means are provided for moving the drum into contact with the actuating gears, and as a result of which the slots for receiving the operating keys are placed adjacent the main bearings, so that the supporting shaft is weakened to a minimum extent. The preferred construction, as shown in Figs. 1 and 2, is such that the softer element of the bearing material between the gears and the shaft is stationary and forms the support for the gears on the drum, as a result of which the contact surface between the rotating element and the support increases as the softer material wears away. This increase of bearing surface reduces the pressure per square inch and this increases the life of the softer material. This contact surface may in time become equivalent to one-half of the circumference of the sleeve. By this arrangement a much greater effective life is given to the bearing than in the case such as that shown in Fig. 3. Fig. 3 has many advantages over constructions as heretofore existing, but the life of the bearing material in the construction of Fig. 3 is not as great as that in Figs. 1 and 2 for the reason that as this sleeve rotates around the steel bushing on the shaft, the bearing material is worn throughout its entire circumference, thus increasing the bore thereof, with the result that the contact surface between the bearing metal and the steel sleeve becomes less and less by reason of wear. The construction shown in Fig. 3, however, has the advantage that the keys for operating the drum are mounted near the main bearings. This structure also has other advantages which will be apparent to those skilled in the art.

While I have shown the hubs of the gears as forming bearings for the drum in the foregoing illustrative embodiment, it will be understood that such construction is not absolutely essential.

By reason of the mounting of the drum upon the hubs of the gears, the drum is more rigidly supported and as a result of which, a stiffer support is secured or a much smaller drum shaft may be used with a given equipment.

Many other advantages will be apparent to those skilled in the art.

I claim:

1. The combination of a shaft, two bearing sleeves mounted on said shaft, two driving members revolubly mounted on said sleeves, a driven member mounted on said shaft between said driving members, coacting means on said driven member and each of said driving members by which said driven member may be driven by either of said driving members, and means acting on said sleeves for moving the driven member longitudinally of the shaft into operative engagement with one or the other of said driving members.

2. The combination of a shaft, two sleeves loosely mounted thereon, two gears loosely mounted on said sleeves, a drum mounted on said shaft between said gears and having portions cooperating with the hubs of said gears to form bearings, means for rotating said gears at different speeds, and means for connecting said drum with either of said gears.

3. The combination of a shaft, two sleeves loosely mounted thereon, two gears loosely mounted on said sleeves and having hubs extending along said shaft, a drum loosely mounted on said shaft and having portions extending over the hubs of said gears to form bearings, means operating through said sleeves for connecting said drum to either of said gears, and means for driving said gears.

4. In combination, a shaft, two sleeves loosely mounted thereon, two driving members loosely mounted on said sleeves and having hub extensions thereon along the shaft, a drum loosely mounted on said shaft and having portions cooperating with the hub extensions of said members to form bearings therewith and means for bringing said drum and either of said members into operative relation.

5. In combination, a shaft, two sleeves loosely mounted thereon, two driving members loosely mounted on said sleeves and having extensions thereon along said shaft, means for preventing movement of said members longitudinally of said shaft, a driven member mounted on said shaft between said members and having end portions cooperating with said extensions to form bearings and means for bringing said driven member into operative relation with either of said driving members.

6. In combination, a shaft, two sleeves loosely mounted thereon, two driving members loosely mounted on said sleeves and fixed against longitudinal movement thereon, a driven member mounted on said shaft and having portions forming bearings with the driving members and means for adjusting for wear of the means for preventing longitudinal movement of said driving members on said shaft.

7. In combination, a shaft, two sleeves loosely mounted thereon, two driving members loosely mounted on said sleeves, means for preventing longitudinal movement of said members on said shaft, a driven member mounted on said shaft between said driving members and provided with portions forming bearings between said driven and driving members, and a key for operating one of said sleeves to move said driven member longitudinally of said shaft into engagement with one of said driving members.

8. In combination, a shaft, two sleeves loosely mounted thereon, two gears mounted on said sleeves, means for preventing longitudinal movement of said gears on said shaft, a drum loosely mounted on said shaft and movable longitudinally thereof, said drum having portions overhanging the hubs of said gears and forming bearings therewith, bearing metal in said bearings and means for adjusting for wear the means for holding said gears against longitudinal movement on said shaft.

9. In combination, a shaft, two sleeves loosely mounted thereon, two gears loosely mounted on said sleeves, means for preventing said gears from longitudinal movement on said shaft, a drum loosely mounted on said shaft and movable longitudinally thereof, said drum having portions cooperating with said gears for forming bearings therewith and means for moving said drum longitudinally of said shaft into cooperative relation with either of said gears.

10. In combination, a shaft, two sleeves loosely mounted thereon and longitudinally movable thereof, two gears loosely mounted on said sleeves and having hub portions extending along said shaft, a drum mounted on said shaft and movable longitudinally thereof and having portions cooperating with said hub extensions and forming bearings therewith, means for moving said drum into cooperative relation with either of said gears, said means comprising said sleeves movable longitudinally of said shaft and means for operating the sleeves.

11. The combination of a stationary shaft, two sleeves loosely mounted thereon, two gears loosely mounted on said sleeves, a drum mounted on said shaft between said gears and having portions cooperating with the hubs of said gears to form bearings, means for driving said gears at different speeds and means for connecting said drum with either of said gears.

12. In combination, a shaft, a sleeve loosely mounted thereon, a driving member loosely mounted on said sleeve and having extensions along said shaft, a flanged nut screwed onto said shaft, an adjustable ring screwed onto one of said extensions and having a flange cooperating with said flanged nut, a drum loosely mounted on said shaft and movable longitudinally thereof, said member having a portion overhanging the other extension of said driving member and forming a bearing therewith, cooperative means on said driving and driven members whereby the same may be connected together and means for bringing driving and driven members into operative relation.

13. In combination, a shaft, two sleeves loosely mounted thereon, two gears mounted on said sleeves, a drum mounted on said shaft between said gears, one of said sleeves being slidable on said shaft and communicating with said drum, means acting through the slidable sleeve for moving said drum into operative engagement with one of said gears and means for driving said gears.

14. In combination, a shaft, two sleeves loosely mounted thereon, two gears mounted on said sleeves, a drum mounted on said shaft between said gears, one of said sleeves being slidable on said shaft and communicating with said drum, means acting through the slidable sleeve for moving said drum into operative engagement with one of said gears, means for driving said gears, and means for preventing movement of said gears longitudinally of said shaft.

15. In combination, a shaft, two sleeves loosely mounted thereon, two gears mounted on said sleeves, a drum mounted on said shaft between said gears, said sleeves being slidable along said shaft and communicating with said drum, friction means affording a driving connection between said gears and said drum, means acting through said sleeves for bringing into operative relation said gears and said drum, means for preventing movement of said gears longitudinally of said shaft and driving means for said gears.

THOMAS SPENCER MILLER.